United States Patent
Köster

(10) Patent No.: US 11,945,268 B2
(45) Date of Patent: Apr. 2, 2024

(54) CONNECTING SYSTEM, COUPLING SYSTEM AND METHOD FOR CONNECTING A TOWING VEHICLE TO A SEMITRAILER

(71) Applicant: SAF-HOLLAND GmbH, Bessenbach (DE)

(72) Inventor: Mario Sebastian Köster, Bodman-Ludwigshafen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 587 days.

(21) Appl. No.: 17/275,866

(22) PCT Filed: Aug. 21, 2019

(86) PCT No.: PCT/EP2019/072349
§ 371 (c)(1),
(2) Date: Mar. 12, 2021

(87) PCT Pub. No.: WO2020/052924
PCT Pub. Date: Mar. 19, 2020

(65) Prior Publication Data
US 2021/0284258 A1  Sep. 16, 2021

(30) Foreign Application Priority Data
Sep. 14, 2018 (DE) ..................... 10 2018 122 577.6

(51) Int. Cl.
*B60D 1/64* (2006.01)
*B62D 53/12* (2006.01)
(Continued)

(52) U.S. Cl.
CPC ............ *B60D 1/64* (2013.01); *B62D 53/125* (2013.01); *B60D 1/015* (2013.01); *B60D 1/60* (2013.01);
(Continued)

(58) Field of Classification Search
CPC ........................................................ B60D 1/64
See application file for complete search history.

(56) References Cited

U.S. PATENT DOCUMENTS 8,052,164 B2 * 11/2011 Alguera .................. B60D 1/64
280/421
8,505,949 B2   8/2013 Temple et al.
(Continued)

FOREIGN PATENT DOCUMENTS

DE   2410229 A1   9/1974
EP   0084712 A2   8/1983
(Continued)

OTHER PUBLICATIONS

European Patent Offce; International Search Report; dated Nov. 1, 2019.

*Primary Examiner* — Kevin Hurley
(74) *Attorney, Agent, or Firm* — Price Heneveld LLP

(57) ABSTRACT

A connecting system and a method for connecting a towing vehicle to a semitrailer includes a first plug unit configured to be fixed to a rotor of a semitrailer unit rotatably mounted on the semitrailer unit about an axis of rotation and having a first coupling portion, and a second plug unit having at least one mounting portion configured to be attached to a coupling plate of a commercial vehicle and a second coupling portion, wherein the first and second coupling portions are configured to be coupled together along a coupling axis such that the coupling axis is substantially parallel to the axis of rotation and spaced from the axis of rotation, and such that the first coupling portion is displaceable relative to the rotor and/or the second coupling portion is displaceable relative to the mounting portion along the coupling axis to engage or disengage the respective opposite coupling portion.

15 Claims, 3 Drawing Sheets

(51) Int. Cl.
    *B60D 1/01*         (2006.01)
    *B60D 1/60*         (2006.01)
    *B62D 53/08*      (2006.01)

(52) U.S. Cl.
    CPC ........ *B62D 53/0821* (2013.01); *B62D 53/085* (2013.01)

(56) References Cited

U.S. PATENT DOCUMENTS

| | | |
|---|---|---|
| 9,085,208 B1 | 7/2015 | Riibe |
| 2009/0008903 A1 | 1/2009 | Richter et al. |
| 2010/0109278 A1 | 5/2010 | Treude et al. |
| 2011/0092080 A1 | 4/2011 | Alguera Gallego et al. |
| 2021/0300136 A1 * | 9/2021 | Algüera ................ B60D 1/015 |

FOREIGN PATENT DOCUMENTS

| | | | | |
|---|---|---|---|---|
| EP | 1900620 A1 | 3/2008 | | |
| EP | 2112008 A1 | 10/2009 | | |
| EP | 2455241 A1 | 5/2012 | | |
| JP | S58-181604 U | 12/1983 | | |
| WO | WO-2008038313 A1 * | 4/2008 | ............... | B60D 1/62 |
| WO | 2018051320 A1 | 3/2018 | | |
| WO | WO-2023175000 A2 * | 9/2023 | ............. | B60D 1/015 |

\* cited by examiner

CONNECTING SYSTEM, COUPLING SYSTEM AND METHOD FOR CONNECTING A TOWING VEHICLE TO A SEMITRAILER

BACKGROUND OF THE INVENTION

The present invention relates to a connecting system, a coupling system and a method for connecting a towing vehicle to a semitrailer. Connecting systems and coupling systems which are equipped with such connecting systems are already known from the prior art. In particular, electrical energy and pneumatic or hydraulic energy are exchanged between a towing vehicle and a trailer, in particular a semitrailer, attached to the towing vehicle, wherein corresponding line systems and plug systems are available in order to be able to establish a connection of the respective electrical and hydraulic or pneumatic lines of the towing vehicle with the respective corresponding lines on the semitrailer. Thus, attempts have been made to arrange corresponding plug systems in the area of the coupling plate, which establish a connection between electric and pneumatic or hydraulic lines during the coupling process of the semitrailer to the towing vehicle. With the known systems, however, it has been shown that individual components of the connecting system can be damaged in the event of a faulty coupling process or, in particular, in the event of an inclined position of the semitrailer in relation to the towing vehicle, in particular if there is jamming of the connecting system caused by the high forces acting between the towing vehicle and the trailer during the coupling process. In addition, the connecting systems known from the state of the art are very complex and take up too much space in the area of the fifth wheel.

It is the object of the present invention to provide a connecting system as well as a coupling system and a method for connecting a towing vehicle to a semitrailer which avoids these disadvantages of the prior art.

SUMMARY OF THE INVENTION

According to the invention, the connecting system for a commercial vehicle comprises a first plug unit and a second plug unit, wherein the first plug unit is adapted to be fixed to a rotor of a semitrailer unit which is rotatably mounted on the semitrailer unit about an axis of rotation, and has a first coupling portion, wherein the second plug unit comprises at least one mounting portion for attachment to a coupling plate of a commercial vehicle and a second coupling portion, wherein the first and second coupling portions are adapted to be coupled together along a coupling axis, said coupling axis being substantially parallel to the axis of rotation and spaced from said axis of rotation, and wherein the first coupling portion is displaceable relative to the rotor and/or the second coupling portion is displaceable relative to the mounting portion along the coupling axis to engage or disengage the respective opposite coupling portion. The connecting system thus comprises two plug units, one of which is designed to be fixed to the semitrailer and one of which is designed to be fixed to the towing vehicle, in particular the coupling plate of the fifth wheel of the towing vehicle. The first plug unit is fixed to a rotor of a semitrailer unit, wherein the rotor is arranged so as to be pivotable or rotatable about an axis of rotation relative to the semitrailer. The rotor is advantageously a turntable of a semitrailer. The axis of rotation is preferably located centrally in the king pin of the semitrailer unit, wherein the rotor serves to compensate for a pivoted position of the towing vehicle relative to the semitrailer by rotating about the axis of rotation and arranging the first plug unit opposite the second plug unit in such a way that the plug units can be connected to one another along or parallel to the coupling axis. The coupling axis is the axis along which the two plug units can be connected to each other. In other words, the coupling axis is the axis along which the coupling areas are moved towards each other in order to establish a connection. It is envisaged in the context of the present invention that the coupling axis is substantially parallel to and spaced from the axis of rotation. In the present case, substantially parallel means that a damped mounting, in particular by means of rubber elements or corresponding elastically deformable components of the coupling portions, can be provided which, on the one hand, can compensate for and damp vibrations and, on the other hand, can compensate for slightly pivoted or twisted arrangements of the two plug units relative to one another. In the present case, an arrangement of the coupling axis pivoted by a few degrees, in particular less than 5°, with respect to the axis of rotation is considered to be substantially parallel. This also allows in the operation of the connecting system, i.e., in the coupled state of the plug units, that vibrations which occur during the travel of the combination of towing vehicle and semitrailer can be compensated by the damped mounting of the coupling portions. The coupling portion of the plug unit is defined in particular as the area of the respective plug unit in which contact pins or contact elements or tube ends are present for establishing an electrical or fluidic connection. Advantageously, the coupling portion is designed as a single component which can be displaced relative to the rest of the respective plug unit and, in particular, is designed as a plug head. At least one of the coupling portions, i.e., the first coupling portion on the first plug unit or the second coupling portion which is formed or fixed on the second plug unit, is adapted for displacement along a coupling axis. It is envisaged in the context of the present invention that at least one of the coupling portions is displaceable relative to the rotor or relative to the mounting portion along the coupling axis to engage with the respective opposite coupling portion. The second coupling portion is mounted on a mounting portion, wherein the mounting portion is designed as a part of the plug unit which serves to be fixed to the coupling plate. In the event that the second coupling portion is displaceable along the coupling axis, the mounting portion therein has a receiving geometry for guiding the second coupling portion. The advantage of the present arrangement of the coupling portions in such a way that they are only displaced along the coupling axis in order to come into engagement with one another, the coupling axis being aligned parallel to the axis of rotation, is that only a one-dimensional translatory movement of the coupling portions relative to one another takes place in order to bring them into engagement with one another. This means that particularly simple and robust guide means are sufficient for the displaceable coupling portions(s), which increases the robustness of the plug system and reduces the installation space requirement. Thus, the second plug unit can be arranged completely below the coupling plate, since it performs a vertical movement relative to the coupling plate or to the surface or sliding surface of the coupling plate, or can be brought into engagement with the first plug unit by a corresponding movement on the latter. Furthermore, this arrangement allows the connection process at the plug units to be separated from the coupling process of the towing vehicle and the semitrailer. In this way, a complete coupling of the semitrailer to the towing vehicle can be established before the connecting system is coupled together, which avoids damage to the connecting system, especially in the case of incorrect couplings.

Preferably, the bearing of the first coupling portion on the rotor and the bearing of the second coupling portion on the mounting portion essentially do not permit any displacement transversely to the coupling axis. This means that the two coupling portions can each only be displaced in a guided manner along the coupling axis. In the present context, essentially no displacement transversely to the coupling axis means that a damped mounting with amplitudes smaller than 1 cm is still to be regarded as a mounting without transverse components to the coupling axis within the scope of the present invention. Also, a rotational movement of the coupling portion about the coupling axis in the range of a few degrees, preferably at most 10°, can be permitted by the bearing of the coupling portions. Particularly preferably, the first and/or the second coupling portion are/is fixed with a clearance fit to the respective engagement geometry on the rotor or on the mounting portion. The previously mentioned damped mounting of the coupling portions makes it possible to compensate for vibrations and slight misalignments of the plug units with respect to each other.

Advantageously, the first plug unit comprises a plurality of first ports extending parallel to the coupling axis, wherein at least two first electrical ports and at least two first fluid ports are provided. The electrical ports and the fluid ports on the first plug unit are arranged and fixed on the coupling portion and preferably have a cross-section that is substantially invariable along the coupling axis, which allows the first ports to be pushed together or to produce an overlap with the respective corresponding second ports on the second plug unit. Since the electrical ports and the fluid ports are each designed for only one coupling movement longitudinally and parallel to the coupling axis, respectively, they can be designed very simply. In particular preferred, a standard component can be used for the area in which the ports are located, which is correspondingly fixed to or integrated in the coupling portion.

Analogous to the arrangement of first ports on the first plug unit, the second plug unit also comprises a plurality of ports extending parallel to the coupling axis, wherein at least two second electrical ports and at least two fluid ports are provided. Thus, at least two electrical ports and at least two fluid ports are provided on both the first and the second plug unit, which can each be brought into connection with one another. The second fluid ports are advantageously designed as pneumatic or hydraulic pressure couplings in which a fluid-tight connection can be established with the respective opposite fluid ports.

Preferably, the first coupling portion and/or the second coupling portion are each engaged by a lifting unit which is designed to displace the respective coupling portion along the coupling axis. In a first preferred embodiment, both the first coupling portion and the second coupling portion can each be displaced along the coupling axis, with a respective lifting unit acting on each of these two coupling portions and transmitting a force along the coupling axis to the respective coupling portion in order to displace it in the direction of the opposite coupling portion or away from it. The lifting unit is advantageously designed as a pneumatic or hydraulic cylinder, which achieves a particularly compact design. In an alternatively preferred embodiment, the lifting unit can be designed as a linkage or as a corresponding mechanical component equipped with lifting units, which is driven by an electric motor. As an alternative to the electric motor, it is also preferred to connect the lifting unit to the securing system which secures the king pin in its position fixed in the receiving portion of the coupling plate. In particular, it is possible for the lifting unit to generate a corresponding force as soon as the securing mechanism of the king pin in the coupling plate is fully closed, wherein, for example, an actuating unit driven by a return element can be triggered in order to transmit a force to the respectively connected coupling portion which displaces it along the coupling axis.

Furthermore, the mounting portion of the second plug unit is preferably designed as a stabilising element, in particular as a sheet metal part, and can be fixed or is fixed to the coupling plate in a material-locking and/or form-fitting manner. The fixing portion of the second plug unit achieves in particular the correct positioning of the second coupling portion relative to the coupling plate of the fifth wheel coupling. For this purpose, the mounting portion in particular has a substantially U-shaped geometry, which creates the spacing of the coupling portion from the coupling plate and in particular from the region in which the king pin enters the coupling plate at the lateral legs of the U in each case. Particularly preferably, the mounting portion is designed as a simple sheet metal part, which is produced, for example, by forming or folding, which significantly reduces the production costs and achieves a corresponding increase in the strength of the material through the forming. The mounting portion can be fixed to the coupling plate and the mounting element on the coupling plate by a material bond, for example by welding, and/or by a form fit, in particular by screwing or riveting or by corresponding recesses. It has been found that in particular a removable fixing of the mounting portion to the coupling plate facilitates the maintenance of the connecting system and can nevertheless transmit large forces between the connecting system and the coupling plate and can even locally reinforce the coupling plate. In an alternative embodiment, the mounting portion can be arranged in one piece on the coupling plate in the area of the receiving portion, wherein in this embodiment the mounting portion preferably forms the so-called tension band of the coupling plate, also called bridge.

Advantageously, the mounting portion has a guide in the form of a recess in which the second coupling portion is guided and secured against displacement transversely to the coupling axis. In particular preferred, in the event that the second coupling portion is designed to be displaceable along the coupling axis, the guide of the second coupling portion in the mounting portion is designed as a recess into which the second coupling portion is inserted and secured against displacement transversely to the coupling axis. This particularly simple design of the mounting portion makes it possible to achieve a bearing of the second coupling portion that can be displaced along the coupling axis in a particularly space-saving manner. Particularly preferably, the guide formed as a recess is rectangular in shape.

Furthermore, the first coupling area preferably has a wedge-shaped engagement geometry which is designed to engage with wedge-shaped tapered guide surfaces of a receiving portion on the coupling plate, wherein the wedge-shaped engagement geometry is formed on a component made integral with the first coupling portion. Advantageously, the first coupling portion is integrally designed on the component, which has a wedge-shaped geometry on its outside. The advantage of this is a particularly compact design of the first plug unit, which enables both the correct alignment of the rotor when coupling and the secure connection to the second plug unit in a small installation space. Thanks to the arrangement of a first plug portion of the first coupling portion on the preferably trapezoidal underside of the first coupling portion, the first plug portion is sufficiently spaced from the surfaces which engage with the V-shaped engagement geometry of the fifth wheel coupling plate and on which lubricants and foreign bodies accumulate.

Advantageously, the first ports are held in a first plug portion, the first plug portion being disposed in a recess on the first coupling portion, the second coupling portion having a second plug portion in the form of a projection, the first and second plug regions engaging in one another in the coupled-together state with an overlap length which is at least 0.3 to 0.5 times the greatest extent of the wedge-shaped engagement geometry parallel to the coupling axis. The design of the first plug portion as a recess protects the contacts and port elements against environmental influences and, in particular, against lateral force effects during coupling. Furthermore, the second coupling portion arranged on the coupling plate is equipped with a second plug portion in the form of a projection, which is designed to engage in the first plug area with an overlap length. The second plug portion is designed to engage with a clearance fit in the first plug portion. The overlap length is advantageously approx. 0.3 to 0.8 times the total extension of the first coupling portion parallel to the coupling axis and in particular at least half as large as the extension of the wedge-shaped engagement geometry measured parallel to the coupling axis. This ensures a secure connection of the plug portions and protects the connection area against foreign bodies.

Preferably, the first plug portion and/or the second plug portion have a substantially rectangular cross-section cut perpendicularly to the coupling axis. Particularly preferably, the first coupling portion achieves functional integration, since, on the one hand, the correct position of the rotor in relation to the coupling plate can be achieved via the wedge-shaped engagement geometry on the coupling portion and, on the other hand, the plug portion is formed integrally with the coupling portion or can be positively fixed into the coupling portion as a standard component. In particular, the combination of the wedge-shaped engagement geometry, which achieves the alignment of the first coupling portion relative to the coupling plate and thus relative to the second coupling portion, and the use of standard components for the first ports can, on the one hand, save installation space and, on the other hand, reduce the manufacturing costs for the connecting system according to the present invention. Preferably, the coupling portion has a recess arranged within the wedge-shaped engagement geometry, into which the second plug portion can be inserted and, in particular, positively fixed. In the context of the present invention, a substantially rectangular cross-section is a distribution of the first plugs arranged in particular substantially within a rectangle, wherein outside the rectangular cross-section there may still be arranged fixing means, such as lugs or analogous corresponding recesses, which deviate from the rectangular shape.

According to the invention, a coupling system is provided which is designed in particular for use in a commercial vehicle, comprising a coupling plate and a semitrailer unit, the coupling plate having a receiving portion with guide surfaces tapering in a wedge shape, the semitrailer unit having a rotor which is mounted rotatably about an axis of rotation and has an engagement geometry arranged eccentrically with respect to the axis of rotation, wherein a first plug unit is fixed to the rotor at the engagement geometry or at a distance from the engagement geometry, wherein a second plug unit is fixed to the coupling plate adjacent to and/or adjoining the receiving portion, wherein the first and/or the second plug unit has/have a coupling portion which can be displaced along a coupling axis, wherein the first coupling portion and the second coupling portion are designed for a coupling parallel to the coupling axis, wherein the coupling axis is essentially parallel to the axis of rotation. In addition to the connecting system described above, a coupling system is also provided within the scope of the present invention, wherein the coupling system refers in particular to the components of a fifth wheel coupling both on the towing vehicle and on the semitrailer, and wherein a coupling system having the features described above is integrated into this fifth wheel coupling. The coupling plate has a receiving portion with wedge-shaped tapered guide surfaces, as is known from the prior art. The second plug unit is fixed directly adjacent to or adjoining this receiving portion, the second plug unit preferably being arranged below the coupling plate and below the receiving portion and being fixed to the coupling plate in particular via a mounting portion. The first plug unit and the second plug unit each have a coupling portion, at least one of the coupling portions being displaceable along a coupling axis. The first plug unit is either itself provided with a wedge-shaped engagement geometry in order to be aligned accordingly by the receiving portion of the coupling plate. Alternatively preferred, the wedge-shaped engagement portion on the rotor is formed or fixed at a distance from the first plug unit, whereby it can be achieved that no large forces act in the area of the plug unit which could lead to damage. In particular preferred, the wedge-shaped engagement geometry can be a steering wedge known from the prior art for controlling a self-steering axle. This steering wedge advantageously aligns the rotor relative to the coupling plate in such a way that the first plug unit is arranged opposite the second plug unit. In this case, the first plug unit can be designed to be flat with the underside of the rotor, i.e. not protruding downwards, which reduces the risk of mechanical damage to the first plug unit. As previously described, it is advantageous that this coupling axis is substantially parallel to the axis of rotation of the rotor on the semitrailer in order to achieve a particularly compact design of the connecting system fixed to the coupling system and thus reduce the overall installation space requirement of the coupling system. Furthermore preferred, due to the arrangement in particular of the second plug unit with little installation space requirement in the immediate vicinity of the receiving portion of the coupling plate, the latter can preferably be arranged in such a way that it is protected against environmental influences, in particular against swirled-up foreign bodies and liquids.

Advantageously, the second plug unit has a mounting portion which is designed as a sheet metal part and is fixed to the coupling plate in a material-locking and/or form-fitting manner, the mounting portion bridging the receiving portion in such a way that it forms a local reinforcement of the coupling plate. Advantageously, the mounting portion is designed as a substantially U-shaped component which is fixed to the coupling plate below it in such a way that it bridges the receiving portion of the coupling plate, i.e., connects and supports the two flanks of the receiving portion. In a particularly preferred embodiment, the mounting portion can also be formed integrally with the coupling plate and, in particular, already be produced during a casting process together with the other reinforcing ribs of the coupling plate. In this case, the mounting portion formed in one piece with the coupling plate has a corresponding recess or a corresponding guide portion for fixing or guided mounting of a second coupling portion.

According to the invention, a method for connecting a towing vehicle to a semitrailer unit is further provided, wherein the towing vehicle has a coupling plate, and the semitrailer unit has a rotor, which is mounted such that it can rotate about an axis of rotation, and a king pin, wherein a first plug unit arranged eccentrically to the axis of rotation is formed or fixed on the rotor, wherein the coupling plate has a receiving region with guide surfaces tapering in a wedge shape and a second plug unit, comprising the steps:

displacing the semitrailer unit transversely to the axis of rotation relative to the coupling plate such that the king pin is inserted into the receiving portion and the rotor is rotated and aligned about the axis of rotation by engagement with the receiving portion, wherein the first plug unit is pivoted into a position opposite the second plug unit;

securing the king pin in the receiving portion of the coupling plate;

coupling the first and second plug units together by displacing a first coupling portion of the first plug unit and/or a second coupling portion of the second plug unit along a coupling axis substantially parallel to the axis of rotation in the direction of the respective opposite plug unit;

producing an at least partial overlap of the coupling portions with each other along the coupling axis.

The decisive advantage of the method described here is that the semitrailer unit is first coupled and secured to the towing vehicle, in particular to the coupling plate of the towing vehicle, whereby the king pin is secured in the receiving area of the coupling plate to secure the towing vehicle to the semitrailer, in particular by a positive lock and corresponding additional securing means. In this state, due to the pivoting of the rotor on the semitrailer unit, the coupling portions on the first plug unit and the second plug unit are already aligned with each other in such a way that there is a common coupling axis along which the coupling areas can be moved towards each other in order to finally be able to engage for the transmission of electrical and fluidic energy. The last step in the method is to produce an partial overlap of the coupling portions along the coupling axis, by means of which an electrical connection and a corresponding fluidic, in particular pneumatic or hydraulic, connection between the respective lines on the first plug unit and on the second plug unit is achieved. Within the scope of the present invention, it is preferably provided that the coupling together of the first and the second plug unit is takes place only after the king pin has been secured to the receiving portion. This can ensure that in the event of incorrect coupling manoeuvres or coupling under unusual inclined positions of the respective coupling on the towing vehicle and on the semitrailer, damage to the plug components, in particular the coupling portions of the two plug units, takes not place. As the king pin is initially secured in the receiving portion, a transverse displacement of the two plug units in relation to each other is excluded and a safe and contact-friendly and low-wear coupling process between the coupling portions of the plug units can be carried out.

BRIEF DESCRIPTION OF THE DRAWINGS

Further advantages and features of the present invention will be apparent from the following description with reference to the accompanying figures. It is shown in.

DETAILED DESCRIPTION OF THE PREFERRED EMBODIMENTS

Figure 1:
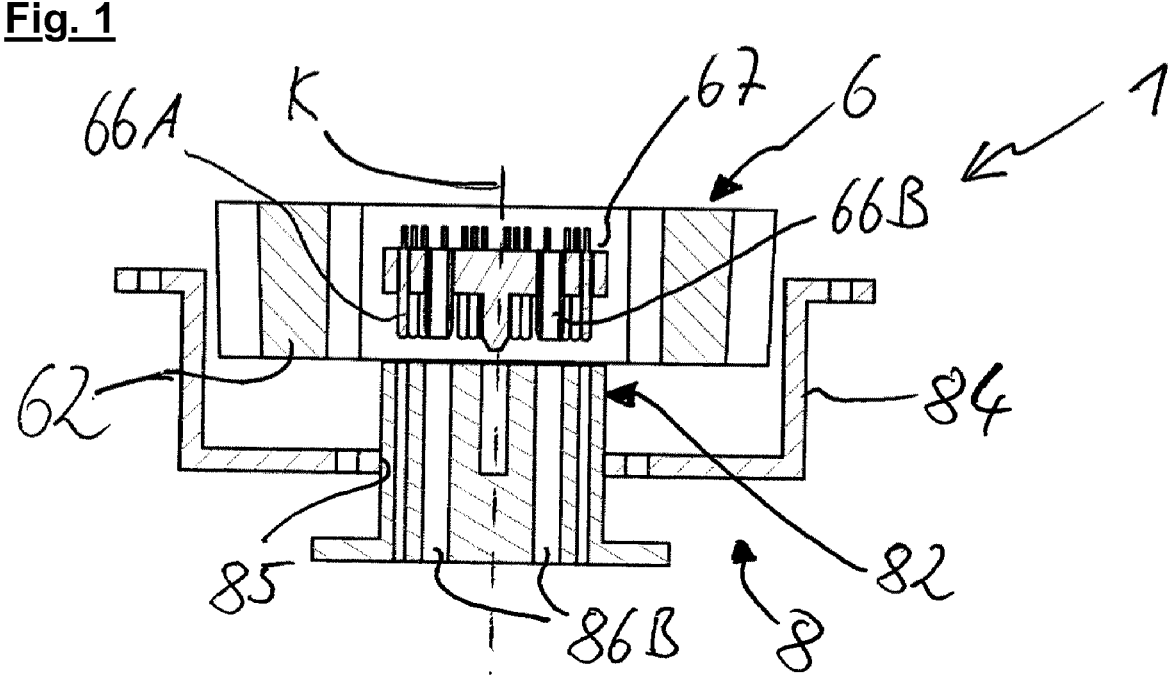
FIG. 1 is a sectional side elevation view of a preferred embodiment of a connecting system according to the invention.

In the embodiment shown in FIG. 1, a connecting system 1 is shown in a sectional view, which has a first plug unit 6 and a second plug unit 8. The first plug unit 6 is advantageously designed to be fixed to a semitrailer unit 4 (see FIG. 5) and has first electrical ports 66A and first fluid ports 66B. The first ports 66A, 66B are arranged in a plug portion 67, wherein this plug portion 67 advantageously has a substantially rectangular basic shape. Furthermore, it is shown that the second plug unit 8 comprises a second coupling portion 82, and a mounting portion 84, wherein the coupling portion 82 is displaceable along a coupling axis K relative to the mounting portion 84. The mounting portion 84 has a guide 85 in the form of a recess in which the second coupling portion 82 is guided. The guide 85 prevents the second coupling portion 82 from being displaced transversely to the coupling axis K. Advantageously, the mounting portion 84 is designed as a U-shaped sheet metal part and has mounting portions at its distal ends, shown on the right and left in the figure above, for fixing to the coupling plate 2 (see FIG. 4). In this preferred embodiment, the mounting portion 84 is formed with flange sections for making a screw connection with the coupling plate 2. Further preferably, the mounting portion 84 is formed as a U-shaped component in order to achieve sufficient spacing of the second coupling portion 82 from the first coupling portion 62 of the first plug unit 6 by support in the flange sections on the coupling plate 2.

Figure 2:
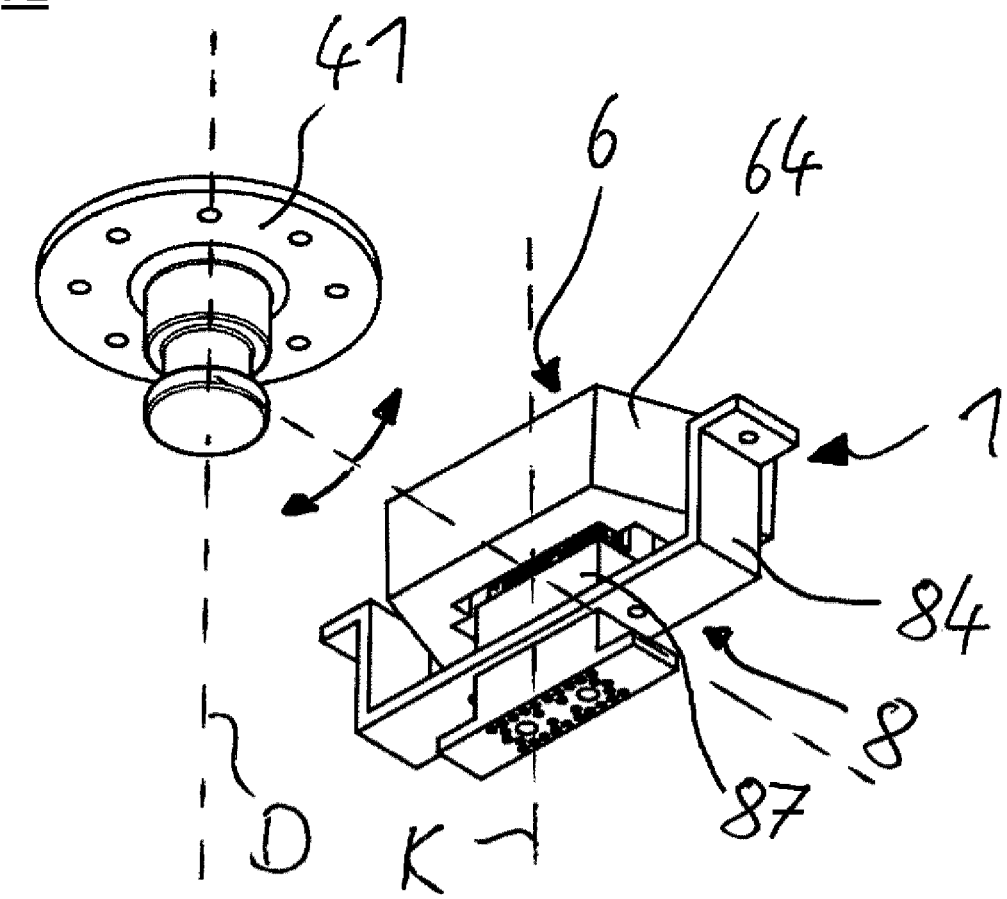
FIG. 2 is an exploded, bottom perspective view of the embodiment of the connecting system according to the invention shown in FIG. 1.

FIG. 2 shows the embodiment shown in FIG. 1 again in perspective view, wherein the king pin 41 of the semitrailer unit 4 is shown in addition to the connecting system 1. The axis of rotation D runs centrally through the king pin 41, and the coupling axis K is offset parallel to it. The arrows shown in a straight line between the axis of rotation D and the coupling axis K indicate how the first plug unit 6 is arranged together with the rotor 42 so that it can swivel about the axis of rotation D. The rotor 42, to which the first plug unit 6 is fixed, is not shown in this view, see FIG. 5. Advantageously, the second coupling portion 82 has a second plug portion 87 in the form of a projection, which serves to engage in the first plug portion 67 in the form of a recess (see FIG. 5). This has the advantage that the second plug portion 87, which is designed as a projection, can also be guided within the recess on the mounting portion 84, which makes a particularly simple construction of the second plug unit 8 possible.

Figure 3:
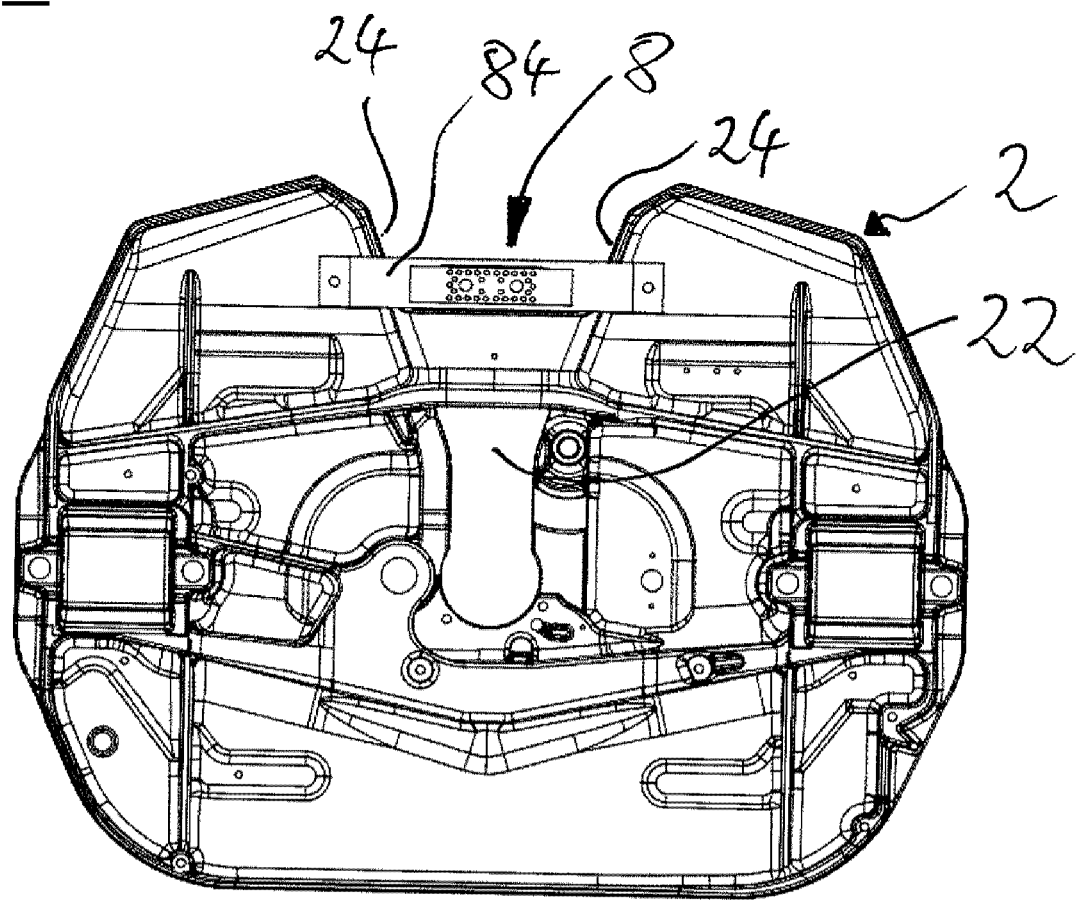
FIG. 3 is a bottom plan view of a coupling plate with components of a preferred embodiment of the connecting system according to the invention.

FIG. 3 shows a view from below of a coupling plate 2 according to the present invention. Advantageously, the coupling plate 2 has a receiving portion 22 into which the king pin 41 can be inserted. Further preferably, the coupling plate 2 has a substantially V-shaped section of the receiving portion 22, in which V-shaped tapered guide surfaces 24 are provided. The wedge-shaped engagement geometry 64 of the first plug unit 6 (see FIG. 2) engages in these guide surfaces 24, whereby the first plug unit 6, together with the rotor 42, is brought into the correct rotational position about the axis of rotation D when inserted into the receiving area 22 and, as soon as the king pin 41 is fully inserted into the receiving portion 22, is aligned opposite and corresponding to the second plug unit 8. The second plug unit 8 is thereby arranged in the area of the guide surfaces 24 of the receiving portion 22, as shown in FIG. 3, and bridges and reinforces the receiving portion 22. The mounting portion 84 of the second plug unit 8 is thereby provided with flange sections which can be screwed to the coupling plate 2. Alternatively, it is also preferred to weld the mounting portion 84 to the coupling plate 2, or to produce a combination of a welded connection with a positive and non-positive connection. Advantageously, the second plug unit 8 shown in FIG. 3 has the features already shown in FIGS. 1 and 2.

Figure 4:
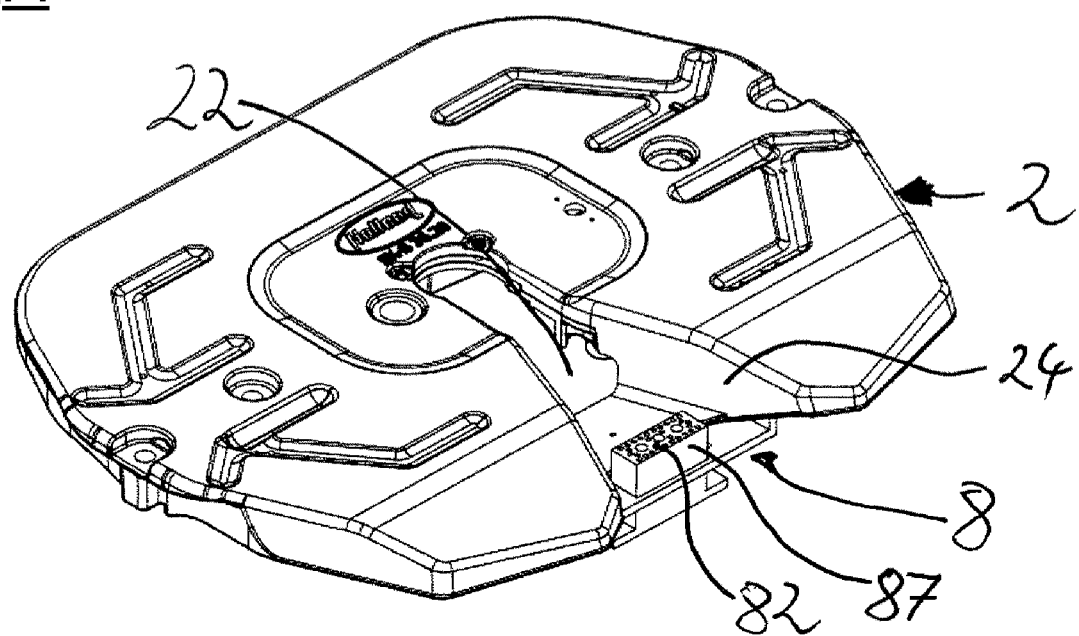
FIG. 4 is a top perspective view of the preferred embodiment of the coupling system shown in FIG. 3.

FIG. 4 shows a perspective view of the preferred embodiment already shown in FIG. 3 to illustrate the arrangement of the second plug unit 8. It can be seen that the second plug unit 8 is arranged in the receiving portion 22 in such a way that the total installation space required for the combination of the fifth wheel coupling 2 and the second plug unit 8 is particularly small. In particular, the second plug unit 8 only insignificantly expands the total volume spanned by the combination of coupling plate 2 and second plug unit 8. In particular, the second plug unit 8 does not protrude beyond the coupling plate 2 towards the bottom right in relation to the arrangement of the fifth wheel coupling on the rear of the vehicle. In the embodiment shown in FIG. 4, the second coupling portion 82 of the second plug unit 8 is shown in the position in which a king pin 41 can be inserted past the second plug unit 8 into the receiving portion 22.

Figure 5:
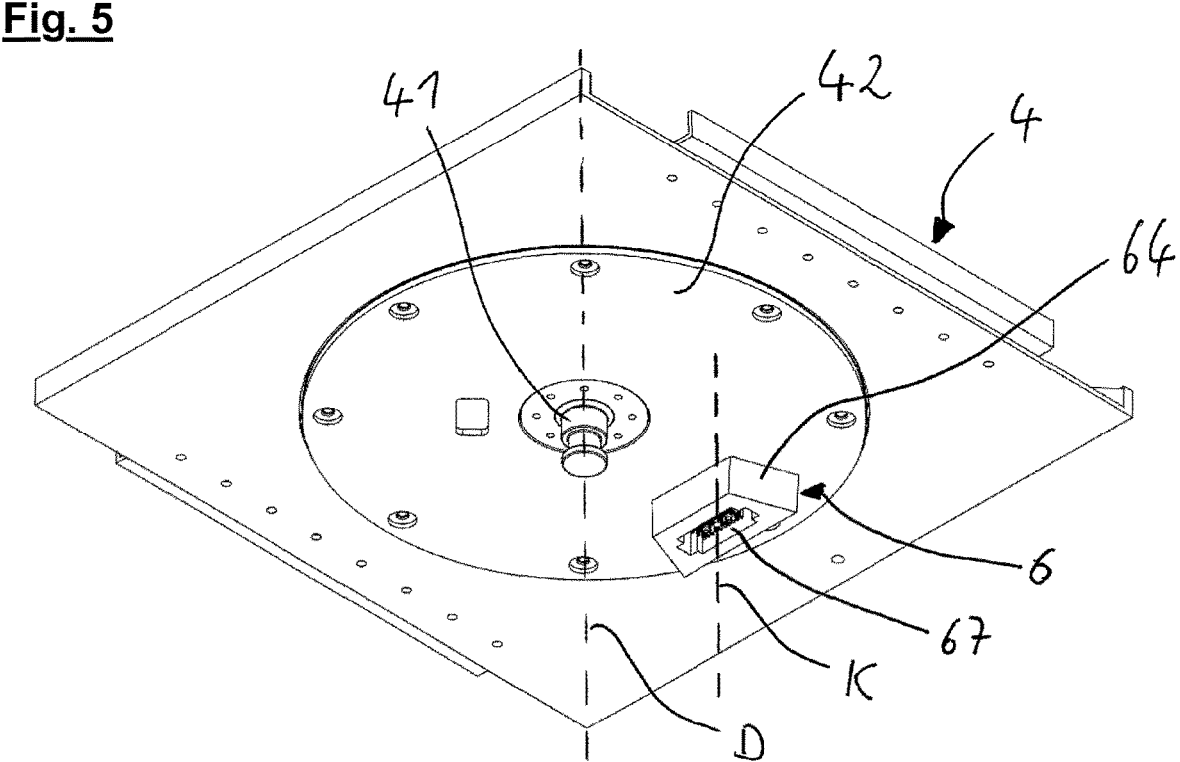
FIG. 5 is a bottom perspective view of a preferred embodiment of a semitrailer unit according to the present invention.

FIG. 5 shows a preferred embodiment of a semitrailer unit 4, wherein it has a king pin 41 and a rotor 42 arranged rotatably about the axis of rotation D defined by the king pin 41. The rotor 42 is arranged relative to the surrounding areas of the semitrailer unit 4, wherein these surrounding areas can be fixed to the frame of the semitrailer, which is not shown. Attached to the rotor 42 is the first plug unit 6, which has a wedge-shaped engagement geometry 64, and a plug portion 67, in which the first ports 66A and 66B are present (see FIG. 1). The first ports 66A and 66B are designed for coupling along the coupling axis K, the coupling axis K being arranged rotatably together with the rotor 42 about the axis of rotation D and being aligned parallel or substantially parallel to the axis of rotation D. The second plug portion 87, which is designed as a projection, engages in the first plug portion 67, which is designed as a recess, whereby FIG. 2 shows the state shortly before this engagement.

Figure 6:
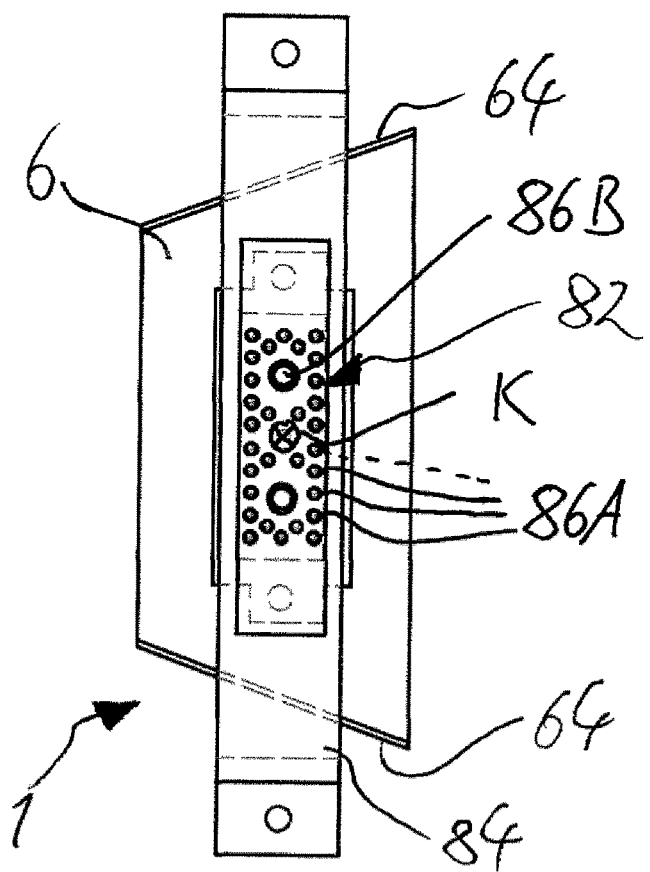
FIG. 6 is a bottom plan view of a preferred embodiment of a connecting system.

FIG. 6 discloses a view of a preferred embodiment of the connecting system 1 as seen from the direction of the second plug unit 8. The second ports 86A and 86B are shown, which are arranged in the second coupling portion 22. The embodiment shown in FIG. 6 essentially has the features of the preferred embodiments of a connecting system 1 already shown in FIGS. 1 and 2.

REFERENCE SIGNS

1—connecting system
2—coupling plate
4—semitrailer unit
6—first plug unit
8—second plug unit
22—receiving portion
24—guide surfaces
41—king pin
42—rotor
62—first coupling portion
64—engagement geometry
66A—first electrical port
66B—first fluid port
67—first plug portion
82—second coupling portion
84—mounting portion
85—guide
86A—second electrical port
86B—second fluid port
87—second plug portion
D—axis of rotation
K—coupling axis

The invention claimed is:

1. A connecting system for commercial vehicles, comprising:
   a first plug unit configured to be fixed to a rotor of a semitrailer unit, which is rotatably mounted on the semitrailer unit about an axis of rotation, and has a first coupling portion, wherein the rotor includes a turntable of the semitrailer unit; and
   a second plug unit that includes at least one mounting portion for attachment to a coupling plate of a commercial vehicle and a second coupling portion;
   wherein the first and second coupling portions are configured to be coupled to each other along a coupling axis, that is substantially parallel to the axis of rotation and spaced from the axis of rotation; and
   wherein the first coupling portion is displaceable relative to the rotor and/or the second coupling portion is displaceable relative to the mounting portion along the coupling axis to engage or disengage the respective opposite coupling portion.

2. The connecting system according to claim 1, a bearing of the first coupling portion on the rotor and a bearing of the second coupling portion on the mounting portion prevent displacement transversely to the coupling axis.

3. The connecting system according to claim 1, wherein the first plug unit includes a plurality of first ports extending parallel to the coupling axis, and wherein the plurality of first ports include at least two first electrical ports and at least two first fluid ports.

4. The connecting system according to claim 1, wherein the second plug unit further includes a plurality of second ports extending parallel to the coupling axis, and wherein the plurality of second ports include at least two second electrical ports and at least two second fluid ports.

5. The connecting system according to claim 1, wherein a lifting unit engages the first coupling portion and/or the second coupling portion, and wherein lifting unit is configured to displace the first coupling portion and/or the second coupling portion along the coupling axis.

6. The connecting system according to claim 1, wherein the mounting portion of the second plug unit comprises a stabilising element configured to be fixed to the coupling plate in a material-locking and/or form-fitting manner.

7. The connecting system according to claim 6, wherein the stabilising element comprises a sheet metal part.

8. The connecting system according to claim 1, wherein the mounting portion includes a guide comprising a recess in which the second coupling portion is guided and secured against displacement transversely to the coupling axis.

9. The connecting system according to claim 1, wherein the first coupling portion includes a wedge-shaped engagement geometry configured to engage with wedge-shaped tapered guide surfaces of a receiving portion of the coupling plate, and wherein the wedge-shaped engagement geometry is formed on a component that is integral with the first coupling portion.

10. The connecting system according to claim 9, wherein a plurality of first ports are held in a first plug portion, wherein the first plug portion is disposed in a recess on the first coupling portion, wherein the second coupling portion includes a second plug portion comprising a projection, and wherein in a coupled-together state the first and second plug portions engage in one another with an overlap length which is at least 0.3 to 0.5 times a greatest extent of the wedge-shaped engagement geometry parallel to the coupling axis.

11. The connecting system according to claim 10, wherein the first plug portion and/or the second plug portion have a substantially rectangular cross-section cut perpendicularly to the coupling axis.

12. A coupling system for commercial vehicles, comprising:
 a coupling plate that includes a receiving portion with guide surfaces tapering in a wedge shape; and
 a semitrailer unit that includes a rotor mounted rotatably about an axis of rotation, and which has an engagement geometry arranged eccentrically with respect to the axis of rotation, wherein the rotor includes a turntable of the semitrailer unit;
 wherein a first plug unit is fixed to the rotor at the engagement geometry or at a distance from the engagement geometry;
 wherein a second plug unit is fixed to the coupling plate adjacent to and/or adjoining the receiving portion;
 wherein the first and/or the second plug unit has/have a coupling portion configured to be displaced along a coupling axis;
 wherein the first coupling portion and the second coupling portion are configured for a coupling parallel to the coupling axis; and
 wherein the coupling axis is substantially parallel to the axis of rotation.

13. The coupling system according to claim 12, wherein the second plug unit includes a mounting portion that comprises a sheet metal part and is fixed to the coupling plate in a material-locking and/or form-fitting manner, and wherein the mounting portion bridges the receiving portion such that the mounting portion provides local reinforcement of the coupling plate.

14. A method of connecting a towing vehicle to a semitrailer unit, comprising:
 providing a towing vehicle that includes a coupling plate; and
 providing a semitrailer unit that includes a rotor which is mounted such that the rotor can rotate about an axis of rotation, and a king pin, wherein the rotor includes a turntable of the semitrailer unit;
 providing a first plug unit arranged eccentrically with respect to the axis of rotation and fixed on the rotor;
 wherein the coupling plate includes a receiving portion with guide surfaces which taper in a wedge shape, and a second plug unit;
 displacing the semitrailer unit transversely to the axis of rotation relative to the coupling plate such that the king pin is inserted into the receiving portion and the rotor is rotated and aligned about the axis of rotation by engagement with the receiving portion, wherein the first plug unit is pivoted into a position opposite the second plug unit;
 securing the king pin in the receiving portion of the coupling plate;
 coupling the first and the second plug units together by displacing a first coupling portion of the first plug unit and/or a second coupling portion of the second plug unit along a coupling axis substantially parallel to the axis of rotation in the direction of the respective opposite plug unit; and
 producing an at least partial overlap of the coupling portions with one another along the coupling axis.

15. The method according to claim 14, wherein the coupling of the first and second plug units together takes place only after the king pin has been secured in the receiving portion.

* * * * *